(12) United States Patent
Arbab et al.

(10) Patent No.: US 10,876,188 B2
(45) Date of Patent: Dec. 29, 2020

(54) METHOD FOR RECYCLING SCRAP OF 2XXX OR 7XXX SERIES ALLOY

(71) Applicant: CONSTELLIUM ISSOIRE, Issoire (FR)

(72) Inventors: Alireza Arbab, Rives-sur-Fure (FR); Laurent Boissonnet, Voiron (FR); Jules Diawara, Evans, WV (US); Pascal Hervieu, Beaucroissant (FR); Anne Pichat, Saint-Cassien (FR)

(73) Assignee: CONSTELLIUM ISSOIRE, Issoire (FR)

( * ) Notice: Subject to any disclaimer, the term of this patent is extended or adjusted under 35 U.S.C. 154(b) by 421 days.

(21) Appl. No.: 15/325,711

(22) PCT Filed: Jul. 10, 2015

(86) PCT No.: PCT/FR2015/051926
§ 371 (c)(1),
(2) Date: Jan. 11, 2017

(87) PCT Pub. No.: WO2016/009139
PCT Pub. Date: Jan. 21, 2016

(65) Prior Publication Data
US 2017/0166997 A1 Jun. 15, 2017

(30) Foreign Application Priority Data
Jul. 16, 2014 (FR) ..................................... 14 01590

(51) Int. Cl.
*C22B 21/00* (2006.01)
*C22B 7/00* (2006.01)
(Continued)

(52) U.S. Cl.
CPC ............ *C22B 21/0092* (2013.01); *B08B 3/08* (2013.01); *B08B 3/12* (2013.01); *C22B 7/006* (2013.01);
(Continued)

(58) Field of Classification Search
CPC ............ C22B 21/0092; C22B 21/0007; C22B 21/0023; C22B 7/006; C22B 7/007;
(Continued)

(56) References Cited

U.S. PATENT DOCUMENTS 4,033,024 A 7/1977 Takahashi et al.
4,435,223 A * 3/1984 Dollman ................ C23G 1/125
134/3

(Continued)

FOREIGN PATENT DOCUMENTS

EP 1690961 A1 8/2006
FR 2902800 A1 12/2007
(Continued)

OTHER PUBLICATIONS

Engineering Tool Box. "Acids—pH Values." [online] Available at: https://www.engineeringtollbox.com/acids-ph-d_401.html Accessed Apr. 17, 2019. (Year: 2003).*
(Continued)

*Primary Examiner* — Tima M. McGuthry-Banks
(74) *Attorney, Agent, or Firm* — McBee Moore & Vanik IP, LLC

(57) ABSTRACT

A method of manufacturing an aluminum alloy ingot using scrap aluminum alloy in the 2xxx or 7xxx series, and a fabrication method after rolling, extrusion and/or forging of an aeronautical structure comprising the steps in the above method, and then at least one rolling, extrusion and/or forging step of the aluminum alloy ingot in the series of scrap used.

20 Claims, 1 Drawing Sheet

(51) Int. Cl.
    *B08B 3/12*    (2006.01)
    *B08B 3/08*    (2006.01)

(52) U.S. Cl.
    CPC .............. *C22B 7/007* (2013.01); *C22B 7/008* (2013.01); *C22B 21/0007* (2013.01); *C22B 21/0023* (2013.01); *C22B 21/0069* (2013.01); *Y02P 10/20* (2015.11)

(58) Field of Classification Search
    CPC ... C22B 7/008; C22B 21/0069; Y02P 10/218; B08B 3/12; B08B 3/08
    See application file for complete search history.

(56) References Cited

U.S. PATENT DOCUMENTS

| | | | | |
|---|---|---|---|---|
| 5,259,960 | A * | 11/1993 | Beck | B01D 61/16 210/638 |
| 6,328,828 | B1 * | 12/2001 | Rusczyk | B08B 3/12 134/1 |
| 6,419,755 | B1 * | 7/2002 | Arruda | C09D 9/00 134/19 |
| 6,551,424 | B1 | 4/2003 | Haszler et al. | |
| 8,202,347 | B2 * | 6/2012 | Verdier | C22B 1/005 75/10.11 |
| 2007/0062336 | A1 * | 3/2007 | Riquet | C22B 21/0069 75/687 |
| 2009/0090635 | A1 * | 4/2009 | Basaly | C11D 3/042 205/213 |
| 2009/0285716 | A1 | 11/2009 | Verdier et al. | |

FOREIGN PATENT DOCUMENTS

| | | | |
|---|---|---|---|
| JP | 01246369 A | * 10/1989 | ............. C23C 22/38 |
| JP | 2003262964 A | 9/2003 | |
| JP | 2008285737 A | 11/2008 | |

OTHER PUBLICATIONS

Sigma-Aldrich. "Triton (TM) X-100." [online]. https://www.sigmaaldrich.com/catalog/product/sial/x100?lang=en&region=US. Accessed Apr. 17, 2019. (Year: 2013).*
JP H01246369 A. Machine translation (Year: 1989).*
International Search Report dated Jan. 26, 2016, issued in counterpart International Application no. PCT/FR2015/051926.
Arnold et al., "Recycling of Li-Containing Aluminum Alloys" Light Metal Age. (Dec. 2011) pp. 32-36.
Wilson et al., "Aluminum-lithium aerospace alloys: a new challenge for recycling" Institution of Mining and Metallurgy. XP009067421. (Jan. 1, 1993) C44-056.

* cited by examiner

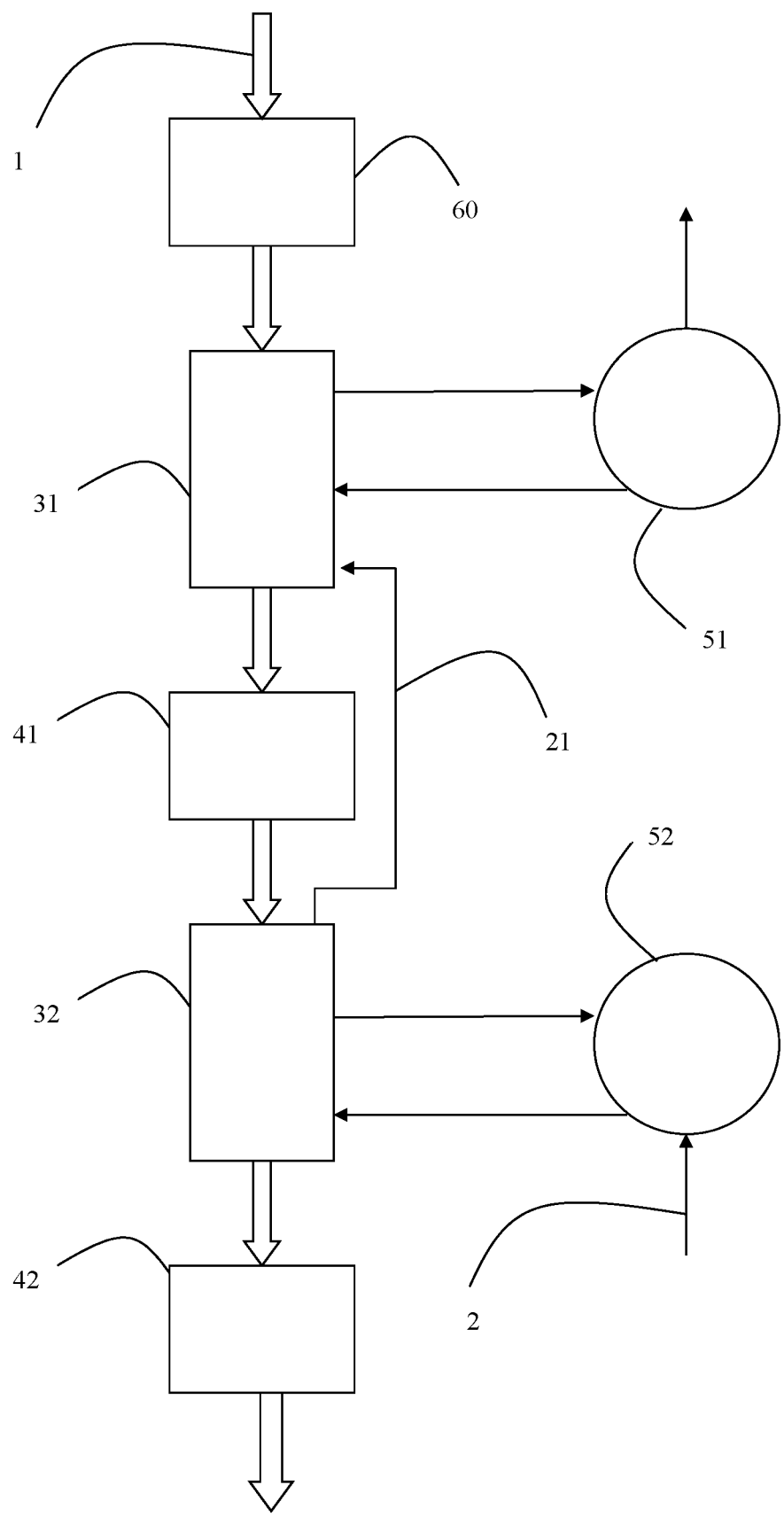

METHOD FOR RECYCLING SCRAP OF 2XXX OR 7XXX SERIES ALLOY

CROSS REFERENCE TO RELATED APPLICATIONS

This application is a § 371 National Stage Application of PCT/EP2015/000471, filed Mar. 3, 2015, which claims priority provisional application No. 61/948,870, filed Mar. 6, 2014.

BACKGROUND

Field of the Invention

The invention relates to the fabrication of ingots of aluminum alloys in the 2xxx or 7xxx series from scrap (raw materials for recycling, such as machining chips or waste) made of alloys in the corresponding series. The invention is applicable particularly to recycling of scrap originating from fabrication processes used in the aeronautical and space industries.

Description of Related Art

Methods used in several industries for the fabrication of finished metal products using methods such as machining, transformation, cutting of intermediate products, generate large quantities of machining chips and machining waste. For the purposes of this text, these chips and waste is referred to by the term "scrap" that is used in standard EN 12258-3, entitled "Aluminium and aluminium alloys—Terms and definitions—Part 3: Scrap (raw materials for recycling)", to refer to products to be recycled (aluminum). The aeronautical and space industries generate a particularly large quantity of scrap because many structural parts and components of an aircraft are obtained by integral machine of solid parts. However, it is often difficult to recycle scrap directly due to the mix with other aluminum alloys or other materials used in the aeronautical industry such as stainless steels and titanium (Wilson et al. Journal de Physique C—75 1987). Machining scrap from aeronautical alloys is thus frequently recycled in aluminum-silicon alloys for use in cast products. This method of reuse will be referred to in the remainder of this text as the "usual method". It leases to a partial loss of the value of the metal and moreover it may no longer be able to absorb all scrap from the aeronautical industry in the near future.

Aluminum alloy products can also be fabricated from scrap for use in the aeronautical and space industries. Patents FR2801060 and FR2902800 thus describe the fabrication of finished and partly finished products made of alloys in the 2xxx series or the 7xxx series starting from raw materials for recycling such as chips or machining waste. This recycling becomes possible due to a purification step of some impurities. This method of reuse will be referred to in the remainder of this text as the "aeronautical method".

The scrap recycling problem is particularly sensitive for 2xxx or 7xxx Al—Li type alloys. For the purposes of this description, a "2xxx or 7xxx Al—Li type alloy" is any 2xxx or 7xxx alloy containing a quantity of lithium exceeding 0.2% by weight and preferably 0.5% by weight. The point that these alloys have in common is the need for special precautions related to the oxidability of lithium. Aluminum alloys containing lithium are less dense than traditional aluminum alloys and consequently there are good reasons to hope that they can reduce the weight of aeronautical parts. However, 2xxx or 7xxx Al—Li type alloys are significantly more expensive than alloys that do not contain lithium, for three reasons: the intrinsic cost of lithium, the cost of creating the metal in the foundry and the difficulty in recycling scrap.

It is known that recycling of scrap from Al—Li alloys in the "aeronautical industry", is difficult (Wilson et al. Journal de Physique C—75 1987).

International application WO2007/015013 describes a method of melting aluminum scrap containing lithium wherein particularly scrap is loaded on an initial bed of liquid metal so as to create a floating mattress with a controlled thickness on the surface of the liquid metal bed that minimizes the use of expensive consumables such as inert gas.

It has been observed that known methods cannot always recycle ingots obtained by melting in the "aeronautical system" particularly due to the content of some alkali elements such as sodium or alkali-earth such as calcium or even some metals like iron. A person skilled in the art knows how to eliminate alkali or alkali earth elements when casting aluminum by the use of a chlorination method in an appropriate ladle. However, due to constraints related particularly to the use of chlorine, it is beneficial to stop using this gas in the foundry for safety reasons and for the environment and moreover, in the case of 2xxx or 7xxx Al—Li type alloys, this process has the disadvantage that it also eliminates a large proportion of the lithium and therefore cannot be economically attractive.

Therefore the problem that this invention attempts to solve is to propose a new method of fabricating aluminum alloy ingots in the 2xxx or 7xxx series capable of incorporating a significant fraction of finely divided scrap while obtaining a low content of unwanted impurities particularly such as alkali elements such as sodium, alkali-earth elements such as calcium and some metals such as iron.

SUMMARY

A first object of the invention is a method of manufacturing an aluminum alloy ingot using scrap aluminum alloy in the 2xxx or 7xxx series wherein
 (i) scrap aluminum alloy in the 2xxx or 7xxx series is procured;
 (ii) optionally, oil present on the scrap is separated,
 (iii) a first treatment operation of said scrap is made by a first liquid at a temperature of at least 10° C., said first liquid being an aqueous solution with pH equal to 1 to 5 or 8 to 13,
 (iv) the first liquid and the scrap thus treated are separated,
 (v) at least one second treatment operation of said scrap by a second liquid is made,
 (vi) the second liquid and the scrap thus treated are separated,
 (vii) said scrap thus obtained is melted,
 (viii) optionally, a first solidification is made in a rough intermediate form,
 (ix) an aluminum alloy ingot in the series of scrap used is cast;

Another object of the invention is a method for fabricating an element of an aeronautical structure comprising the steps in the above process and also at least one rolling, extrusion and/or forging step of said aluminum alloy ingot in the series of scrap used, said aeronautical structure element being chosen from among elements that make up the fuselage such as the fuselage skin, fuselage stiffeners or tracks, pressure bulkheads, circumferential frames, wings, such as the wing skin, stiffeners, ribs and spars and the empennage composed particularly of horizontal and vertical stabilizers, and floor beams, seat tracks and doors.

BRIEF DESCRIPTION OF THE DRAWINGS

FIG. 1: Diagram of a scrap treatment line according to the invention.

DETAILED DESCRIPTION OF A PREFERRED EMBODIMENT

Unless mentioned otherwise, all information about the chemical composition of alloys is expressed as a percent by mass. Consequently, in a mathematical expression, "0.4 Li" means: 0.4 times the lithium content expressed as a percent by mass; this is applicable to other elements mutatis mutandis. The designation of alloys follows the rules of the Aluminum Association, known to a person skilled in the art.

Unless mentioned otherwise, the definitions in European standard EN 12258-1 are applicable. Terms related to scrap and recycling of scrap are described in standard EN12258-3.

The term "machining" includes any method for removing material such as turning, milling, drilling, reaming, tapping, electrical discharge machining, grinding, polishing.

Scrap that might be recycled by the method according to this invention can be in several forms, but preferably includes finely divided scrap, in other words scrap with a cross-section smaller than 50 mm$^2$. One particularly preferred form is referenced under the term "turnings" in standard EN12258-3, which denotes production scrap composed of grains, chips, shavings, produced by machining or other operations. Scrap that can be recycled in the framework of the invention may be in different states: mainly bulk scrap and ground scrap, scrap in pellets possibly being suitable in cases where the component parts are sufficiently small. The dimensional characteristics of the scrap are important for implementation of this invention. If the scrap is procured in compact form, a decompaction step is usually necessary.

Scrap that can be used in this invention is also characterized by its density. The apparent density of the scrap is measured as follows: a cylindrical receptacle with a capacity of 1 liter is filled with scrap, vibration is applied in the form of small shocks so as to compact the scrap. The operation is repeated until the receptacle is filled to the brim. The apparent density of the scrap is determined using the weight of the filled receptacle minus the weight of the empty receptacle. It is preferable if the apparent density of the scrap is between 0.05 and 0.8 t/m$^3$ (tonnes per cubic meter), preferably 0.1 to 0.7 t/m$^3$ and even more advantageously between 0.2 and 0.4 t/m$^3$.

The inventors have observed that the chemical composition of ingots obtained after melting scrap can be significantly improved when the scrap is treated by a first treatment operation with a first liquid at a temperature of at least 10° C., said first liquid being an acid or basic aqueous solution with pH values equal to 1 to 5 or 8 to 13 respectively, followed by at least one second treatment operation with a second liquid. Advantageously, the first liquid is acid and its pH is between 1 and 5, preferably between 2 and 4 and even more preferably between 2 and 3. Inorganic acids, particularly such as phosphoric acid, sulfuric acid or nitric acid, or organic acids particularly such as acetic acid, citric acid, sulfamic acid, can be used alone or in combination so as to obtain the required acid aqueous solution. Preferably, the first liquid contains phosphoric acid. Treatment with an acid first liquid is more efficient then treatment with a basic first liquid in eliminating undesirable impurities. In the case of a basic first liquid, organic bases or ammonia based and/or mineral based products can be used and particularly alkaline salts such as soda or potash, alkaline earths such as lime, are typically used. It is beneficial to use salts containing silicates. The treatment temperature by the first liquid is advantageously between 20 and 80° C.

In general, the scrap is covered with lubricants that may be emulsions or straight oils are that are generally referred to herein as "oil". The quantity of oil present on the scrap varies as a function of the fabrication step during which it is generated and the technology used to remove the metal. Thus, the quantity of oil present on the scrap obtained during the scalping operation of rolling slabs is usually low. On the other hand, the quantity of oil present on the scrap obtained from machining operations is much higher.

The inventors of this invention have observed that degreasing the scrap using a detergent alone, in other words a product containing at least one chemical compound with surfactant properties, also called a surfactant product or a surfactant, cannot significantly reduce the content of unwanted impurities after recycling. However, a step prior to separation of oil, typically be dripping or centrifuging or by treatment with an organic solvent or a detergent with neutral pH before the first treatment operation with the first acid or basic aqueous solution can advantageously avoid excessive pollution of the first liquid with oil during the first treatment operation.

Advantageously, the first liquid comprises at least one surfactant. Preferably, the surfactant is a non-ionic surfactant because these products even further reduce the content of undesirable impurities. Appropriate non-ionic surfactants include products with an R—CO—O—R' ester bond, where R is typically a non-polar chain and R' is a polar chain, such as glycol esters, for example ethylene glycol stearate, glycerol esters, for example glycerol stearate, polyoxyethyleneglycol esters, sorbitan esters, and polyoxyethylene sorbitan esters, more frequently called Tweens or polysorbates, sugar esters, surfactants with an R—O—R' ether bond where R is typically a non-polar chain and R' is a polar chain, such as fatty alcohol ethers and polyoxyethyleneglycol, for example Triton®X100 with formula $C_8H_{17}C_6H_4(OC_2H_4)_{9-10}OH$), surfactants with an R—CO—NH—R' amide bond, where R is typically a non-polar chain and R' is a polar chain.

The duration of the first treatment operation depends on stirring conditions and the ratio between the quantity of treated scrap and the treatment solution. Typically, the treatment duration is between a few minutes and a few tens of minutes. Said operation can be done discontinuously by batch, or continuously. Advantageously, said first operation is done while continuously feeding scrap.

Advantageously, a simultaneous ultrasound treatment is applied during said first treatment operation, at a frequency typically between 10 kHz and 100 kHz and preferably between 15 kHz and 35 kHz.

After said first treatment operation, the scrap thus treated is separated from said first liquid, advantageously such that the residual quantity of liquid does not exceed 50% by weight, and preferably 20% by weight and even more preferably 10% by weight of the material transferred from the first operation to the second operation. The transferred material is composed of transferred scrap and entrained liquid. Said separation may be done by at least one means such as for example settlement, filtration, draining, centrifuging and/or blowing. Advantageously, said separation is done by centrifuging such that the residual quantity of liquid does not exceed 10% by weight of the material transferred from the first operation to the second operation.

A second treatment operation using a second liquid is then applied to the scrap thus separated.

In one embodiment of the invention, said second treatment operation is rinsing and said second liquid comprises essentially water, advantageously the second liquid in this embodiment is deionized water. In another embodiment of said invention, said second liquid is an aqueous solution with a pH greater than the pH of the first liquid if the pH of the first liquid is between 1 and 5, and less than the pH of the first liquid if the pH of the first liquid is between 8 and 13, advantageously the pH of the second liquid is between the pH of the first liquid and 7. In all cases, it is advantageous to add at least one surfactant to said second liquid, preferably a non-ionic surfactant of the type described as being possible additives to the first liquid.

Advantageously, a simultaneous ultrasound treatment is applied during said second treatment operation, at a frequency typically between 10 kHz and 100 kHz and preferably between 15 and 35 kHz.

Other treatment steps by other liquids can be added between said first treatment operation and said second treatment operation or after said second treatment operation. Between each treatment operation, the scrap thus treated is separated from the treatment liquid, preferably such that the residual quantity of liquid does not exceed 50% by weight, and preferably 20% by weight and even more preferably 10% by weight of the transferred material, advantageously by centrifuging. Advantageously, the method only includes the first and the second treatment operations. In another embodiment, the method includes a third operation after the first and the second operations, this third operation preferably being of the rinsing type.

After the last treatment operation by a last liquid, the last treatment liquid is separated from the scrap, advantageously such that the residual quantity of liquid does not exceed 3% by weight, preferably by centrifuging, and/or the scrap is dried by heat treatment in a furnace at a temperature typically between 60 and 350° C., preferably between 80 and 300° C., and even more preferably between 105 and 130° C. Advantageously, centrifuging and drying are done such that the residual quantity of liquid does not exceed 0.05% by weight.

Preferably, scrap treatment operations are done continuously and treatment liquids circulate in the direction opposite to the direction of the scrap. Advantageously, said second liquid is added to said first liquid preferably at a flow rate by volume equal to at least 0.1 times the scrap feed rate by volume and preferable equal to between 0.2 and 1.0 times and even more preferably between 0.3 and 0.8 times the scrap feed rate by volume and the entrained quantity of the first liquid does not exceed 50% by weight and preferably 20% by weight and even more preferably 10% by weight of the transferred material, typically by centrifuging after the first treatment operation.

FIG. 1 illustrates a continuous embodiment of the method according to the invention. The scrap flow is represented by double arrows (1) and the liquid flow is represented by single arrows (2, 21). The direction of the liquid flow is opposite the direction of the scrap flow. Scrap is procured and an oil separation step is carried out on it on it in an appropriate device (60). The first treatment operation is then carried out on the scrap with the first liquid in the device (31), a separation of the first liquid in the device (41), the second treatment operation with the second liquid in the device (32), a separation of the second liquid in the device (42), and is then dried and remelted. The first liquid is stored and possibly retreated and/or stabilized in the first tank (51) that feeds the device (31). The second liquid is stored and possibly retreated in the second tank (52) that feeds the device (32). The second liquid feeds the first liquid (21).

Scrap that can be recycled using this invention is composed essentially of alloys in the 2xxx or the 7xxx series, since typically these alloys should not be mixed. Alloys in the 2xxx or 7xxx series that do not contain lithium and that are suitable include for example the AA2X24, AA2026, AA2027, AA2029, AA2139, AA2056, AA7010, AA7X40, AA7X49, AA7X50, AA7X55, AA7X75, AA7X81, AA7X85 alloys. Advantageously, scrap that could be recycled within the framework of this invention is composed essentially of suitably sorted 2xxx Al—Li type alloys. Suitable alloys include for example AA2050, AA2055, AA2060, AA2065, AA2070, AA2076, AA2090, AA2091, AA2094, AA2095, AA2097, AA2098, AA2099, AA2195, AA2196, AA2197, AA2198, AA2199, AA2295, AA2296, AA2297, AA2397, as defined by the Aluminum Association. This invention can be used to make ingots that can be used in the aeronautical industry from these alloys starting from scrap.

The method according to the invention can also include a step to reduce the quantity of solid ferrous waste, particularly a magnetic sorting system to eliminate ferrous elements such as screws or bolts that contaminate the scrap. A magnetic method of eliminating ferrous elements can also be applied during treatment operations in the method according to the invention, particularly during the first treatment operation, such a method being capable particularly of eliminating ferrous particles.

The scrap this dried is then melted. A melting method like that described in application WO2007/015013 wherein scrap is loaded on an initial bed of liquid metal so as to create a floating mattress with controlled thickness on the surface of the liquid metal is advantageous. In another embodiment of the invention, scrap is introduced into a furnace wherein a vertex movement is created so achieve fast immersion. In one advantageous embodiment of the invention, scrap derived from the treatment by the first and the second liquids is compacted to be introduced into a melting furnace from which an ingot is cast that can be used directly for rolling, forging and/or extrusion.

The scrap thus melted is finally cast in the form of an ingot made of an alloy in the same series as the scrap used, in other words in the 2xxx series if the scrap used is the 2xxx series and in the 7xxx series if the scrap used is in the 7xxx series. The ingot can be cast directly or after a first solidification in a rough intermediate form that cannot be used for subsequent deformation such as a "bowl" or a "sow". Advantageously, the proportion of the metal in the ingot derived from melting scrap is equal to at least 5% by weight, preferably at least 15% by weight and even more preferably equal to at least 25% by weight. The remainder originates from other aluminum based products and alloy elements added to correct the metal content. Said other aluminum based products are typically firstly large sized recycled products such as alloy waste in the 2xxx or 7xxx series with known composition, and secondly "new" aluminum products, in other words made of so-called "pure" aluminum or low alloy aluminum, typically containing more than 99.8% of aluminum.

The ingot thus obtained can be used in the aeronautical industry. Thus the ingot can be a sheet ingot that, after rolling, will typically be transformed into a thin plate or a thick plate, or an extrusion ingot that, after extrusion, will be transformed into the form of a section or a rough forging that, after forging, will be transformed into a forged product, these plates, sections and forged products possibly being used for the fabrication of structural elements for use in aeronautics, such as elements making up the fuselage (fuselage skin, fuselage stiffeners or stringers, bulkheads, circumferential frames), wings (such as wing skin, stiffeners or stringers, ribs and spars) and the empennage composed particularly of horizontal and vertical stabilizers, and floor beams, seat tracks and doors.

EXAMPLES

Example 1

In this example, different solutions for treating scrap composed of a 2xxx Al—Li type alloy are studied.

Scrap obtained by machining an AA2050 alloy is procured. Table 1 shows the measured composition of Cu, Li, Mg, Ag, Ca and Na after melting

TABLE 1

Composition of the scrap in Cu, Li, Mg, Ag, Ca and Na
(% by weight for Cu, Li, Mg, Ag and ppm for Ca and Na)

| Cu | Li | Mg | Ag | Ca | Na |
|---|---|---|---|---|---|
| 3.5 | 0.8 | 0.3 | 0.4 | 51 | 18 |

500 g of scrap was treated for 10 minutes by 4 liters of a first liquid with the composition given in Table 2, rinsed with deionized water and then dried in a drying oven at 105° C. for about 3 hours.

TABLE 2

Treatment conditions

| Treatment | pH | Temperature | Surfactant | Main component - concentration |
|---|---|---|---|---|
| 1 | 11.7 | 50° C. | Ethoxylated C13-15 fatty alcohol | Tetrasodium pyrophosphate and anhydrous disodium tetraborate (15 g/l) |
| 2 | 7 | 50° C. | $C_8H_{17}C_6H_4(OC_2H_4)_{9-10}OH$ (1 g/l) | |
| 3 | 2 | 16° C. | | Nitric acid (1 g/l) |
| 4 | 3 | 16° C. | | Acetic acid (20 g/l) |

The scrap was then melted and cast. Table 3 shows the composition of Cu, Li, Mg, Ag, Ca and Na obtained.

TABLE 3

Composition of the scrap in Cu, Li, Mg, Ag, Ca and Na obtained after treatment and melting (% by weight for Cu, Li, Mg, Ag and ppm for Ca and Na)

| Treatment | Cu | Li | Mg | Ag | Ca | Na |
|---|---|---|---|---|---|---|
| 1 | 3.3 | 0.8 | 0.3 | 0.4 | 25 | 17 |
| 2 | 3.4 | 0.7 | 0.3 | 0.4 | 49 | 10 |
| 3 | 3.6 | 0.8 | 0.3 | 0.4 | 27 | 10 |
| 4 | 3.6 | 0.8 | 0.4 | 0.3 | 25 | 8 |

Treatments 1, 3 and 4 according to the invention result in a composition after casting that can be used in an AA2050 alloy ingot, the calcium content being 50% lower than it was in the initial scrap. Treatments 3 and are particularly advantageous because the sodium content is also low.

Example 2

In this example, other liquids were studied to treat another batch of a 2xxx Al—Li type alloy for which the composition in Cu, Li, Mg, Ag, Ca and Na is given in Table 4.

TABLE 4

Composition of the scrap in Cu, Li, Mg, Ag, Ca and Na (%
by weight for Cu, Li, Mg, Ag and ppm for Ca and Na) *

| Cu | Li | Mg | Ag | Ca | Na |
|---|---|---|---|---|---|
| 3.6 | 0.8 | 0.3 | 0.4 | 45 | 130 |

\* the Ca and Na content is measured on the surface and the content present in the metal is added 500 g of scrap was treated for 30 minutes in 4 liters of one of the liquids for which the composition given in Table 5, rinsed with deionized water and then dried in a drying oven at 105° C. for about 3 hours.

TABLE 5

Treatment conditions

| Treatment | pH | Temperature | Surfactant | Main component - concentration |
|---|---|---|---|---|
| 5 | 2 | 20° C. | $C_8H_{17}C_6H_4(OC_2H_4)_{9-10}OH$ (1 g/l) | $H_3PO_4$ (5 g/l) |
| 6 | 2.2 | 20° C. | | $H_3PO_4$ (1 g/l) |
| 7 | 1 | 20° C. | | $HNO_3$ (5 g/l) |
| 8 | 2.6 | 20° C. | | $CH_3COOH$ (20 g/l) |
| 9 | 7 | 50° C. | $C_8H_{17}C_6H_4(OC_2H_4)_{9-10}OH$ (1 g/l) | |
| 10* | 7 | 50° C. | $C_8H_{17}C_6H_4(OC_2H_4)_{9-10}OH$ (1 g/l) | |
| 11* | 7 | 50° C. | | |

*in the presence of ultrasounds

The quantity of calcium remaining in the scrap after the treatment was calculated by adding the quantity present in the metal and the extractable quantity. The results are given in Table 6.

TABLE 6

Composition of the scrap in Cu, Li, Mg, Ag, Ca and Na after treatment (% by weight for Cu, Li, Mg, Ag and ppm for Ca and Na)*

| Treatment | Cu | Li | Mg | Ag | Ca | Na |
|---|---|---|---|---|---|---|
| 5 | 3.6 | 0.8 | 0.4 | 0.4 | 20 | 2 |
| 6 | 3.6 | 0.8 | 0.4 | 0.4 | 23 | 15 |
| 7 | 3.6 | 0.8 | 0.3 | 0.4 | 21 | 12 |
| 8 | 3.6 | 0.8 | 0.4 | 0.4 | 23 | 2 |
| 9 | 3.6 | 0.8 | 0.4 | 0.4 | 38 | 42 |
| 10 | 3.6 | 0.8 | 0.4 | 0.4 | 40 | 42 |
| 11 | 3.6 | 0.8 | 0.3 | 0.4 | 46 | 42 |

*the Ca and Na content is measured on the surface and the content present in the metal is added.

Treatments 5 to 8 according to the invention result in a composition after casting that can be used in an AA2050 alloy ingot, because the Ca and Na content is at least 50% lower than it was in the initial scrap, treatment 5 being particularly effective.

Example 3

In this example, a 2xxx Al—Li type alloy for which the composition in Cu, Li, Mg, Ag, Ca and Na is given in Table 7, was treated continuously. The scrap residence time in the first and the second liquids was about 5 minutes.

TABLE 7

Composition of the scrap in Cu, Li, Mg, Ag, Ca and Na (% by weight for Cu, Li, Mg, Ag and ppm for Ca and Na) *

| Cu | Li | Mg | Ag | Ca | Na |
|---|---|---|---|---|---|
| 3.6 | 0.8 | 0.3 | 0.4 | 85 | 63 |

* the Ca and Na content is measured on the surface and the content present in the metal is added The scrap batch was treated with a first liquid for which the composition is given in Tableau 8, and was then centrifuged, rinsed with deionized water and then centrifuged again.

TABLE 8

Treatment conditions

| pH | Temperature | Surfactant | Main component - concentration |
|---|---|---|---|
| 2-2.5 | 50° C. | $C_8H_{17}C_6H_4(OC_2H_4)_{9-10}OH$ (1 g/l) | $H_3PO_4$ (5 g/l) |

Table 9 gives the calcium content of the scrap for various treatment conditions.

TABLE 9

Effect of treatment parameters on the scrap composition

| Treatment | separation of liquid after the first treatment operation | % by weight of liquid in the material transferred from the first to the second operation (% by weight) | Ratio between the feed flow by volume of the first liquid by the second liquid and the scrap flow by volume | Ca (ppm)* |
|---|---|---|---|---|
| 12 | Centrifuge | 7% | 0.5 | 22 |
| 13 | Centrifuge | 7% | 0.25 | 25 |
| 14 | Centrifuge | 7% | 0.1 | 73 |
| 15 | Centrifuge | 7% | 1 | 21 |
| 16 | Drain | 74% | 0.5 | 28 |
| 17 | Drain | 74% | 0.25 | 74 |

*the Ca content is measured on the surface and the content present in the metal is added.

Test 12 can give a particularly advantageous compromise between the calcium content and liquid consumption.

The invention claimed is:

1. Method of manufacturing an aluminum alloy ingot using scrap aluminum alloy in the 2xxx or 7xxx series wherein
   (i) scrap aluminum alloy in the 2xxx or 7xxx series is procured;
   (ii) optionally, oil present on the scrap is separated,
   (iii) a first treatment operation of said scrap is made by a first liquid at a temperature of at least 10° C., said first liquid being an aqueous solution with pH equal to 1 to 5, wherein said first liquid consists of phosphoric acid optionally in combination with at least one of sulfuric acid, nitric acid, or organic acid, and at least one non-ionic surfactant,
   (iv) the first liquid and the scrap thus treated are separated,
   (v) at least one second treatment operation of said scrap by a second liquid is made, (vi) the second liquid and the scrap thus treated are separated,
(vii) said scrap thus obtained is melted,
(viii) optionally, a first solidification is made in a rough intermediate form,
(ix) an aluminum alloy ingot in the series of scrap used is cast.

2. Method according to claim 1, wherein the pH of said first liquid is between 2 and 4.

3. Method according to claim 1, wherein said non-ionic surfactant is chosen from among a product with an ester bond, a product with an ether bond and/or a product with an amide bond.

4. Method according to claim 1, wherein an ultrasound treatment is applied during said first treatment operation and/or during said second treatment operation, at a frequency between 10 kHz and 100 kHz.

5. Method according to claim 1, wherein, after a last treatment operation of said scrap by a last liquid, the last treatment liquid and the scrap are separated such that a residual quantity of liquid does not exceed 3% by weight and/or the scrap is dried by heat treatment in a furnace at a temperature between 60 and 350° C.

6. Method according to claim 1, according to which said second liquid comprises water.

7. Method according to claim 1 wherein the second liquid is an aqueous solution for which the pH is
(i) greater than the pH of the first liquid, or
(ii) between the pH of the first liquid and 7.

8. Method according to claim 1, wherein at least one surfactant is added to the second liquid.

9. Method according to claim 1 wherein the scrap treatment operations are done continuously and treatment liquids circulate in the direction opposite to the direction of the scrap.

10. Method according to claim 9, wherein said second liquid is added to said first liquid at a flow rate by volume equal to at least 0.1 times the scrap feed rate by volume and wherein the entrained quantity of the first liquid does not exceed 50% by weight of material transferred between the first and the second treatment operation.

11. Method according to claim 10, wherein entrained quantity of the first liquid does not exceed 10% by weight of material transferred between the first and the second treatment operation.

12. Method according to claim 9, wherein said second liquid is added to said first liquid at a flow rate by volume equal to between 0.2 and 1.0 times the scrap feed rate by volume.

13. Method according to claim 1, wherein said scrap is at least one 2xxx Al—Li type alloy selected from the group consisting of AA2050, AA2055, AA2060, AA2065, AA2070, AA2076, AA2090, AA2091, AA2094, AA2095, AA2097, AA2098, AA2099, AA2195, AA2196, AA2197, AA2198, AA2199, AA2295, AA2296, AA2297, and AA2397.

14. Method according to claim 1 wherein the proportion of metal in the ingot derived from melting scrap is equal to at least 5% by weight.

15. Method according to claim 1, wherein scrap derived from the treatment by the first and the second liquids is compacted to be introduced into a melting furnace from which an ingot is cast that can be used directly for rolling, forging and/or extrusion.

16. Method for the fabrication of an element of an aeronautical structure according to claim 1 and also comprising at least one rolling, extrusion and/or forging of said aluminum alloy ingot in a series of scrap used, wherein said aeronautical structure element is selected from the group consisting of fuselage, wings, and empennage.

17. Method according to claim 1, wherein the first liquid and the scrap are separated by centrifuging, and the second liquid and the scrap are separated by centrifuging.

18. Method according to claim 1, wherein the proportion of metal in the ingot derived from melting scrap is equal to at least 25% by weight.

19. The method according to claim 1, wherein said first liquid consists of phosphoric acid in combination with at least one of sulfuric acid, nitric acid, or organic acid, and at least one non-ionic surfactant.

20. The method according to claim 19, wherein the organic acid is selected from the group consisting of acetic acid, citric acid, and sulfamic acid.

* * * * *